United States Patent
Kojima et al.

(10) Patent No.: US 10,935,935 B2
(45) Date of Patent: Mar. 2, 2021

(54) SAFETY CONTROL UNIT, SAFETY CONTROL METHOD, AND SAFETY CONTROL PROGRAM

(71) Applicant: OMRON Corporation, Kyoto (JP)

(72) Inventors: Tatsuya Kojima, Kyoto (JP); Koji Yaoita, Kyoto (JP); Takamasa Ueda, Kyoto (JP); Katsushige Ohnuki, Kyoto (JP)

(73) Assignee: OMRON CORPORATION, Kyoto (JP)

( * ) Notice: Subject to any disclaimer, the term of this patent is extended or adjusted under 35 U.S.C. 154(b) by 0 days.

(21) Appl. No.: 16/325,422

(22) PCT Filed: Aug. 23, 2017

(86) PCT No.: PCT/JP2017/030049
§ 371 (c)(1),
(2) Date: Feb. 14, 2019

(87) PCT Pub. No.: WO2018/061538
PCT Pub. Date: Apr. 5, 2018

(65) Prior Publication Data
US 2019/0212708 A1 Jul. 11, 2019

(30) Foreign Application Priority Data
Sep. 30, 2016 (JP) .............................. JP2016-194883

(51) Int. Cl.
*G05B 9/02* (2006.01)
*G05B 19/418* (2006.01)
*G05B 19/05* (2006.01)

(52) U.S. Cl.
CPC .............. *G05B 9/02* (2013.01); *G05B 19/05* (2013.01); *G05B 19/418* (2013.01); *G05B 2219/14006* (2013.01); *G05B 2219/14007* (2013.01)

(58) Field of Classification Search
CPC .... G05B 19/05; G05B 19/056; G05B 19/418; G05B 2219/13153; G05B 2219/14006; G05B 2219/14007; G05B 9/02
See application file for complete search history.

(56) References Cited

U.S. PATENT DOCUMENTS 5,572,671 A * 11/1996 Eisenberg ........... G06F 11/0796
702/186
5,765,000 A 6/1998 Mitchell et al.
(Continued)

FOREIGN PATENT DOCUMENTS

CN 1171850 A 1/1998
CN 101154187 A 4/2008
(Continued)

OTHER PUBLICATIONS

An English translation of the International Search Report of PCT/JP2017/030049 dated Oct. 3, 2017.
(Continued)

*Primary Examiner* — Chad G Erdman
(74) *Attorney, Agent, or Firm* — Metrolex IP Law Group, PLLC

(57) ABSTRACT

A safety control unit includes: a memory; a computation control part; and an input and output unit for connecting the computation control part to a safety input device and an output device to be safely controlled. A system program includes a data refresh program for executing a data refresh of safety control data of the safety input device and the output device and the control data of the memory via the input and output unit. If the computation control part
(Continued)

receives a change of a control program, the computation control part stops executing the control program. The computation control part executes the change of the control program while executing a part of the system program including the data refresh. The computation control part resumes executing the control program.

5 Claims, 4 Drawing Sheets

(56) References Cited

U.S. PATENT DOCUMENTS

| | | |
|---|---|---|
| 2007/0162157 A1 | 7/2007 | Chandhoke |
| 2008/0083030 A1 | 4/2008 | Durham et al. |
| 2009/0005884 A1* | 1/2009 | Ikegami ............... G05B 19/058 |
| | | 700/18 |
| 2016/0202685 A1 | 7/2016 | Shimizu et al. |
| 2017/0097624 A1* | 4/2017 | Viste ................... G06F 9/44526 |
| 2017/0099158 A1 | 4/2017 | Mizutani et al. |

FOREIGN PATENT DOCUMENTS

| | | |
|---|---|---|
| CN | 105302055 A | 2/2016 |
| CN | 105468378 A | 4/2016 |
| CN | 105785902 A | 7/2016 |
| EP | 2947526 A2 | 11/2015 |
| JP | S62-89108 A | 4/1987 |
| JP | H08-106307 A | 4/1996 |
| JP | H11-259308 A | 9/1999 |
| JP | 2009-9505 A | 1/2009 |
| JP | 2014-89883 A | 5/2014 |
| WO | 2015/133175 A1 | 9/2015 |

OTHER PUBLICATIONS

The Written Opinion of PCT/JP2017/030049 dated Oct. 3, 2017.
The extended European search report dated Dec. 2, 2019 in a counterpart European patent application.
Office Action dated Sep. 1, 2020 in a counterpart Japanese patent application.
Office Action (CNOA) issued on Dec. 16, 2020 in a counterpart Chinese patent application.

* cited by examiner

SAFETY CONTROL UNIT, SAFETY CONTROL METHOD, AND SAFETY CONTROL PROGRAM

TECHNICAL FIELD

The present invention relates to a safety control unit for FA systems, and a safety control technique in FA systems.

BACKGROUND ART

Currently, many FA (Factory Automation) systems are used.

As described in Patent Document 1, external devices of an FA system are controlled by a control unit (programmable logic controller). With such a configuration of the FA system, a safety control system that uses a safety device as an external device can also be constituted.

In such a safety control system, a control unit (safety control unit) performs batch conversion (data refresh) of control data including data for safety control, with respect to any external devices including the safety device. Specifically, after the control unit executes a series of programs for controlling the FA system, the control unit performs a data refresh and again executes the series of programs. The data for safety control is updated at the time of this data refresh. Then, the safety control in the safety control system is realized by repeating this process.

RELATED ART DOCUMENT

Patent Document

Patent Document 1: JP 2009-9505A

SUMMARY OF THE INVENTION

However, if conventional safety control units are subject to a program change from the outside, the conventional safety control units temporarily stop all programs including any data refresh. For this reason, the safety control unit can not input safety control data, and stops the external devices included in the FA system. That is, the safety control of the FA system stops.

Accordingly, the present invention aims to provide a safety control unit and a safety control technique that can prevent an unnecessary stop due to safety control, for example, at a time when a program is changed.

Means for Solving the Problems

A safety control unit according to the present invention includes: a memory that stores a system program for safety control, a control program for safety control, and a control data; a computation control part configured to execute safety control using the control data, the system program, and the control program; and an input and output unit for connecting the computation control part to a safety input device and an output device to be safely controlled. The system program includes a data refresh program for executing a data refresh of safety control data of the safety input device and the output device and the control data of the memory via the input and output unit. If the computation control part receives a change of the control program, the computation control part stops executing the control program. The computation control part executes the change of the control program while executing a part of the system program including the data refresh. The computation control part resumes the execution the control program.

In this configuration, because the data refresh is continued when the control program is changed, the safety control is continued.

Effects of the Invention

According to the present invention, an unnecessary stop of the safety control can be prevented, for example, at a time when a program is changed.

EMBODIMENTS OF THE INVENTION

Figure 1:
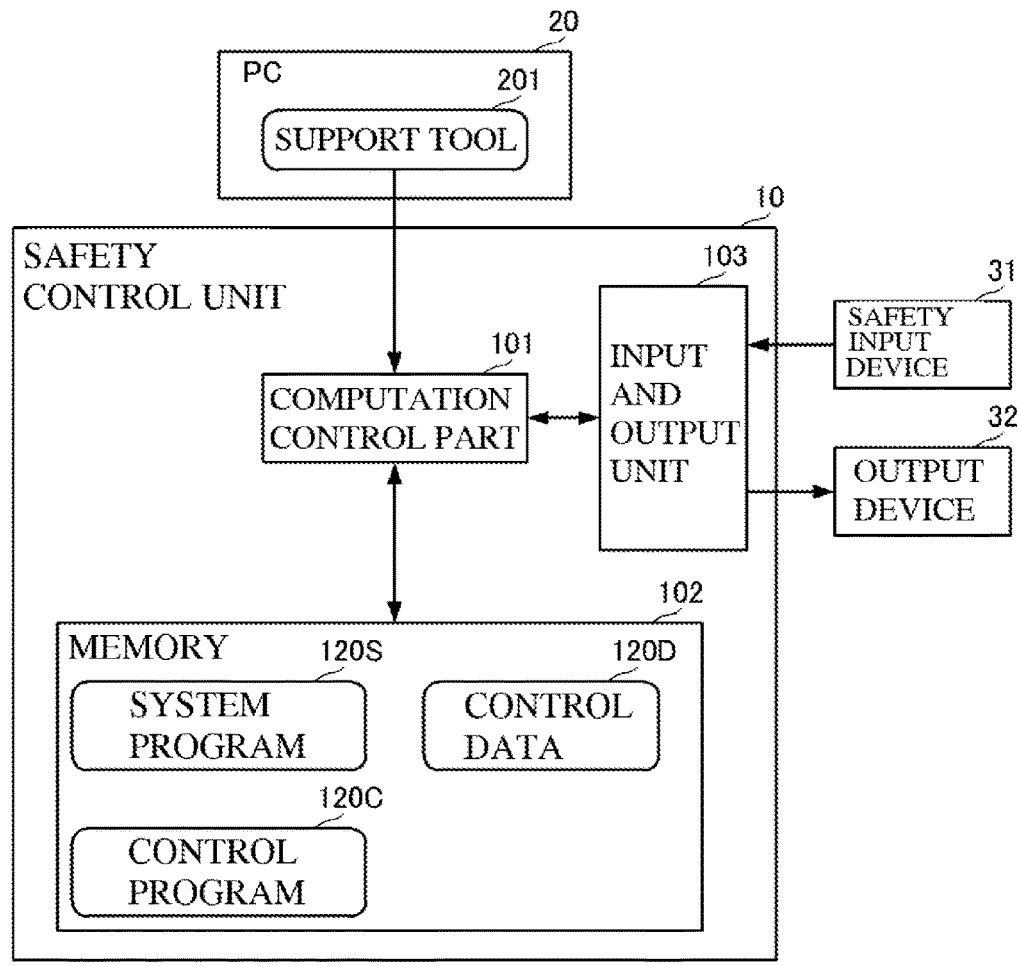
FIG. 1 is a block diagram showing a schematic configuration of a safety control system including a control unit according to an embodiment of the present invention.
Figure 2:
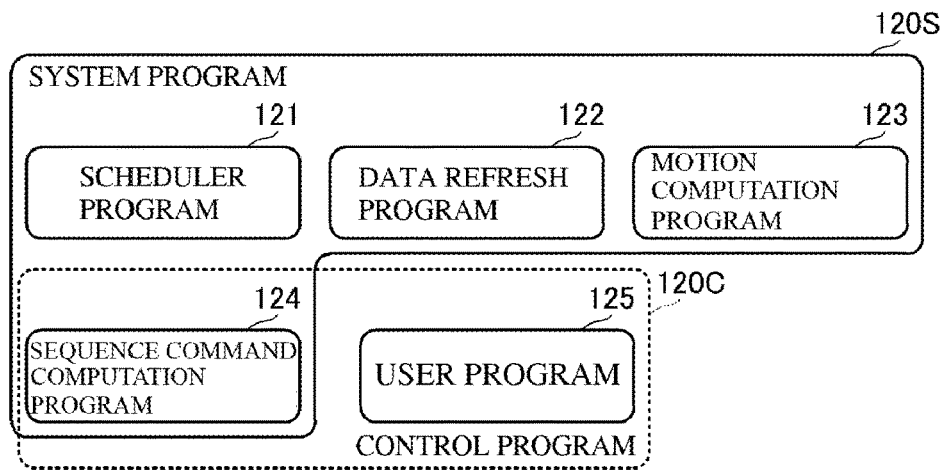
FIG. 2 is a diagram showing configurations of a system program and a control program.
Figure 3:
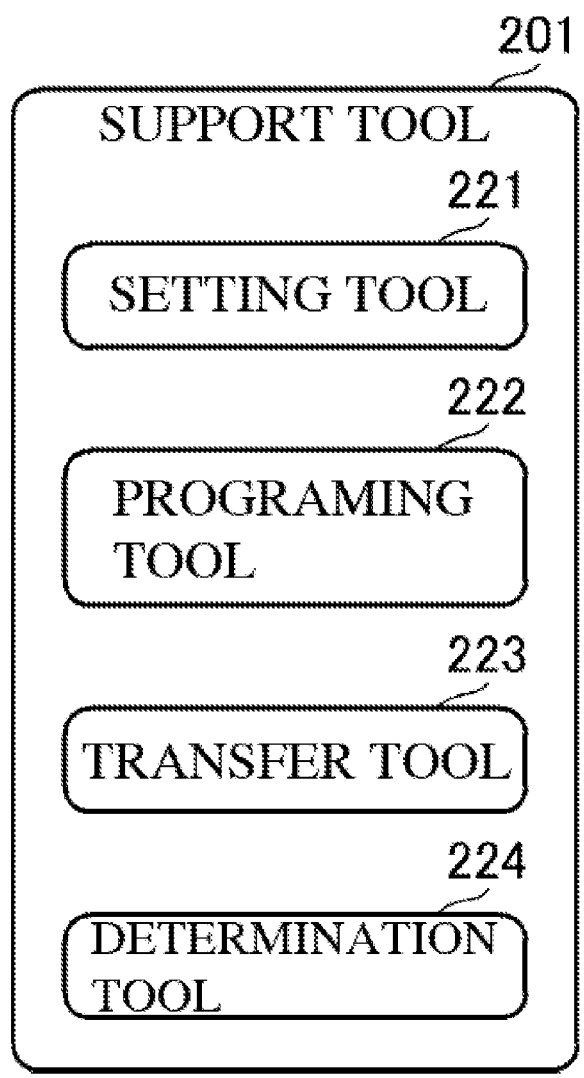
FIG. 3 is a diagram showing a configuration of a support tool.

A safety control unit and a data safety control technique according to an embodiment of the present invention will be described with reference to the drawings. FIG. 1 is a block diagram showing a schematic configuration of a safety control system including a safety control unit according to the embodiment of the present invention. FIG. 2 is a diagram showing configurations of a system program and a control program. FIG. 3 is a diagram showing a configuration of a support tool.

As shown in FIG. 1, a safety control unit 10 is connected to a PC (personal computer) 20, a safety input device 31, and an output device 32. The safety control unit 10, the safety input device 31, and the output device 32 are connected through a predetermined data network. Note, that it is preferable that this data network is constituted with protocols with high connection reliability. The safety control unit 10, the safety input device 31, and the output device 32 realize a safety control system using an FA (Factory Automation) system. Note, that a general input device may be connected to this safety control system.

The safety input device 31 is a device for obtaining data for safety control, such as a light curtain or a safety switch. The output device 32 executes operations regarding safety control through relays, motors, lamps, and the like of the FA system. Note, that one safety input device 31 and one output device 32 are shown in FIG. 1, but multiple safety input devices 31 may be arranged and multiple output devices 32 may be arranged.

The safety control unit 10 and the PC 20 are locally connected via, for example, a general data communication cable. A support tool 201 is incorporated in the PC 20. The safety control unit 10 downloads programs and setting information that are created using the support tool 201.

The safety control unit 10 includes a computation control part 101, a memory 102, and an input and output unit 103. The computation control part 101 is connected to the memory 102 and the input and output unit 103. The input and output unit 103 is connected to the safety input device 31 and the output device 32 via the above-mentioned data network.

As shown in FIG. 1, the memory 102 stores a system program 120S, a control program 120C, and control data 120D. As shown in FIG. 2, the system program 120S has a scheduler program 121, a data refresh program 122, a motion computation program 123, and a sequence command computation program 124. The control program 120C has the sequence command computation program 124 and a user program 125.

The control data 120D is referred to when the system program 120S and the control program 120C are executed. A safety control continuation setting variable 120R is a variable in which whether to continue safety control when the control data 120 D is rewritten is set, that is, whether to continue data refresh is set.

The scheduler program 121 manages the schedules of various processes that the computation control part 101 executes.

The data refresh program 122 performs batch conversion of the safety control data stored in the control data 120D in the memory 102 and the input and output unit 103, and performs batch conversion of the safety control data stored in the control data 120D in the memory 102 and the safety input device 31 and the output device 32 via the input and output unit 103. More specifically, the data refresh program 122 executes the process for reflecting the safety control data from the safety input device 31 in the control data 120D via the input and output unit 103, and executes the process for outputting output data for safety control and computation results from the motion computation program 123 and the user program 125 to the output device 32 via the input and output unit 103. Note, that the output data for safety control is used for controlling the states of the output device 32, based on input data for safety control.

The motion computation program 123 performs computations for controlling motion devices such as motors (e.g., servo motors), based on data that a general input device obtains.

The sequence command computation program 124 belongs to the system program 120S and the control program 120C, and is a program based on the ladder diagram for safety control that is created by the support tool 201.

The user program 125 executes various settings for safety control created by the support tool 201.

The computation control part 101 continuously executes the system program 120S and the control program 120C, while referring to the control data 120D. Specifically, based on the scheduler program 121, the computation control part 101 executes the motion computation program 123, the sequence command computation program 124, and the user program 125. At this time, the computation control part 101 refers to the control data 120D.

Upon completion of the execution of the motion computation program 123, the sequence command computation program 124, and the user program 125, the computation control part 101 executes the data refresh program 122. Specifically, the computation control part 101 performs, using the data refresh program 122, batch conversion of the control data 120D in the memory 102 and the safety control data of the safety input device 31 and the output device 32 via the input and output unit 103.

Upon completion of the data refresh, the computation control part 101 executes the motion computation program 123, the sequence command computation program 124, and the user program 125 with reference to the control data 120D subjected to the data conversion. The safety control of the FA system is realized by the computation control part 101 repeating this series of processes.

As shown in FIG. 3, the support tool 201 has a setting tool 221, a programing tool 222, a transfer tool 223, and a determination tool 224. The setting tool 221 is used for creating the user program 125 including the above-mentioned various settings. The programing tool is used for creating a ladder diagram, in other words, is used for creating the sequence command computation program 124. The transfer tool 223 is used for converting the user program 125 created by the setting tool 221 and the sequence command computation program 124 created by the programing tool 222 into the data format to be transferred to the computation control part 101, and is used for transferring these data. The determination tool 224 is used for determining whether the safety control needs to be stopped, that is, whether the data refresh needs to be stopped when the user program 125 and the sequence command computation program 124 are transferred.

Figure 4:
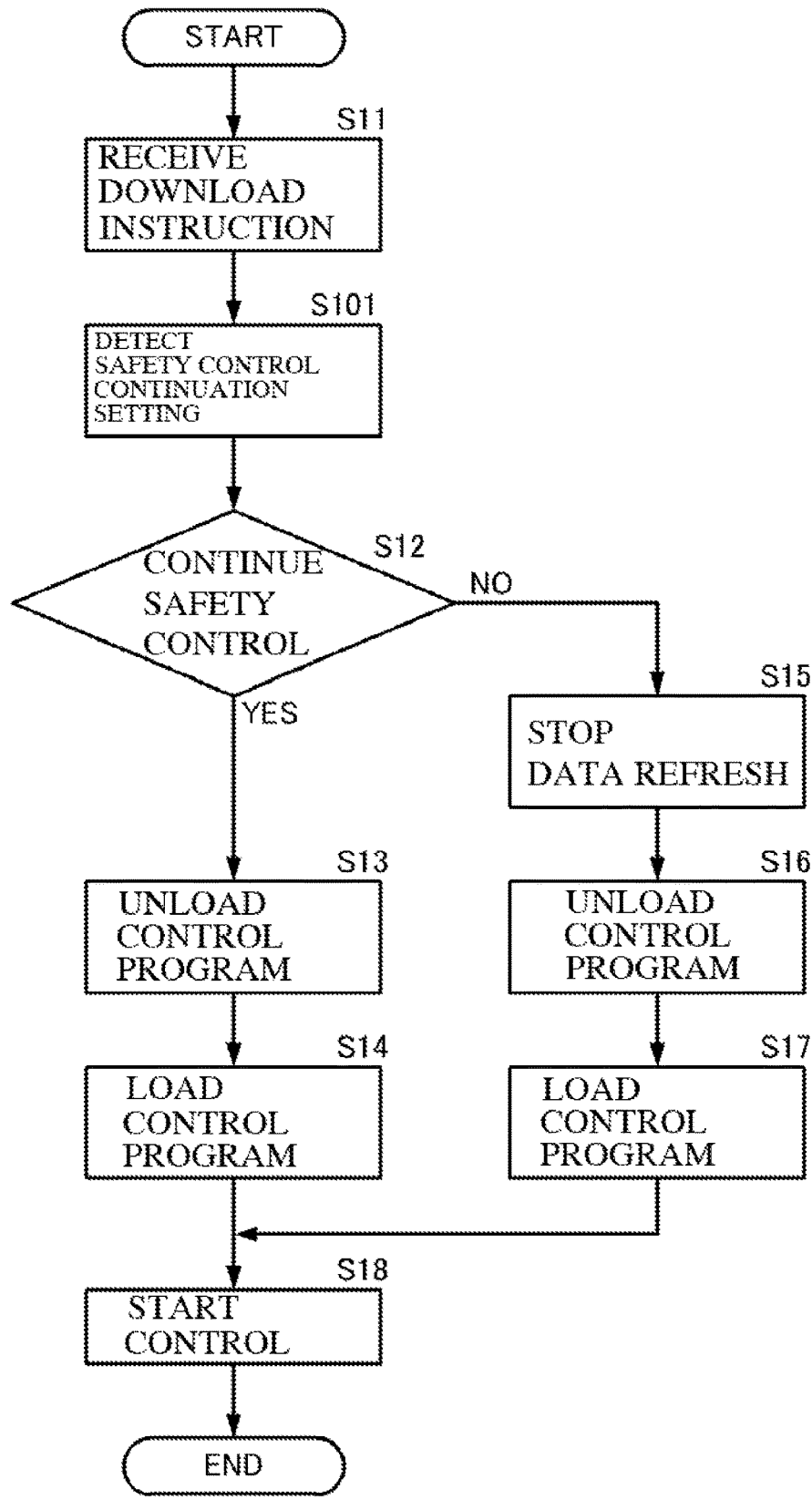
FIG. 4 is a flowchart of a safety control process in a computation control part.

In this configuration, if the user program 125 and the sequence command computation program 124 are to be rewritten with the changes of the various settings and the ladder diagram, the computation control part 101 executes the following processes. FIG. 4 is a flowchart of a safety control process in the computation control part.

As shown in FIG. 4, the computation control part 101 receives an instruction for rewriting the user program 125 and the sequence command computation program 124, that is, a download instruction (S11). While the computation control part 101 receives no download instruction, the computation control part 101 continuously executes, as mentioned above, the system program 120S including the data refresh and the control using the control program 120C, while referring to the control data 120D.

The computation control part 101 refers to the download instruction, and detects whether to change the control program 120C while continuing the safety control (S101).

If the detection result is setting for continuing the safety control (YES in S12), the computation control part 101 stops executing the control program 120C, and unloads the control program 120C (S13). At this time, the computation control part 101 continuously executes a part of the system program 120S including the data refresh program 122 without stopping the execution, except for the sequence command computation program 124.

Next, the computation control part 101 loads the control program 120C (the sequence command computation program 124 and the user program 125) that is downloaded from the support tool 201 (S14). At this time, the computation control part 101 continuously executes a part of the system program 120S including the data refresh program 122 without stopping the execution, except for the sequence command computation program 124.

Then, the computation control part 101 resumes executing the control program 120C (S18).

By executing these processes, if the change of the control program 120C is not related to safety control, the safety control unit 10 can change the control program 120C without temporarily stopping the data refresh. In this manner, an unnecessary temporary stop of the safety control can be prevented.

Note, that if the detection result is the setting for not continuing the safety control (NO in S12), the computation control part 101 stops executing the data refresh program 122 (S15). That is, the computation control part 101 stops safety communication to the devices related to the safety control. After that, the computation control part 101 unloads the control program 120C (S16), and loads the control program 120C that is downloaded from the support tool 201 (S17). Then, the computation control part 101 resumes executing the system program 120S and the control program 120C (S18).

With this configuration, an administrator and the like of the FA system can select whether the change of the system program 120S and the control program 120C with the stop of the safety control is needed.

Figure 5:
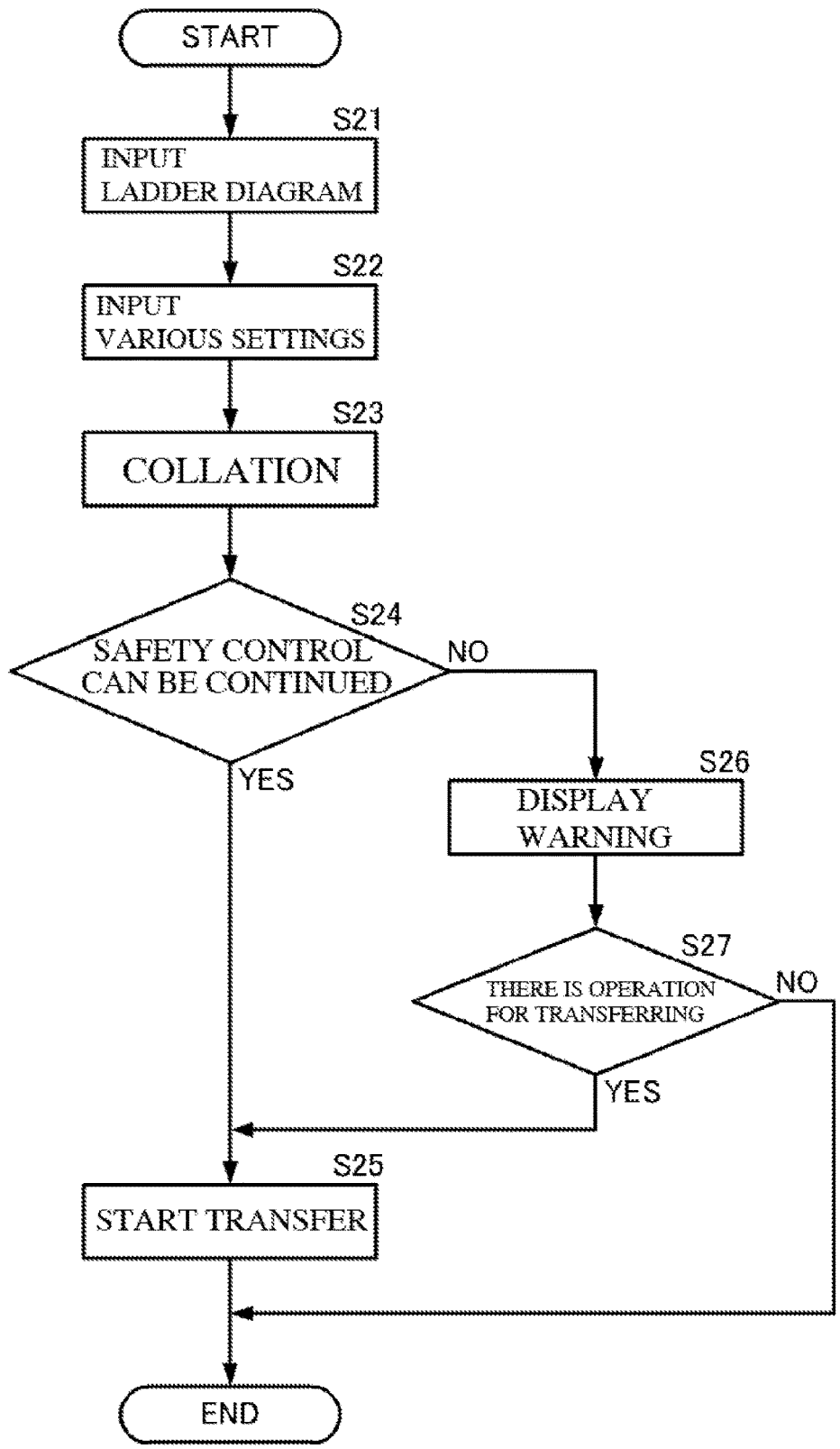
FIG. 5 is a flowchart of a program change process in the support tool.

In addition, as shown in FIG. 5, with the configuration shown in FIG. 3, the support tool 201 may also execute the transfer after it determines whether the stop of the safety control is needed when the control program 120 is changed. FIG. 5 is a flowchart of a program change process in the support tool.

The support tool 201 receives an input of a ladder diagram including a safety control process from a programmer using the programing tool 222 (S21). Also, the support tool 201 receives an input regarding various settings for safety control from a programmer using the setting tool 221 (S22). Through these processes, the control program 120C is created, which has the sequence command computation program 124 and the user program 125, and includes safety control. Note, that the order of step S21 and step S22 is not limited to this order, and may be reversed.

The support tool 201 collates, using the determination tool 224, the program that is created and changed by the support tool 201 and the program that is stored in the memory 102 of the safety control unit 10 (S23).

Based on the collation result, the support tool 201 determines, using the determination tool 224, whether the stop of the safety control is needed when the control program 120C is changed.

If it is detected that the stop of the safety control is not needed (YES in S24), the support tool 201 starts transferring the control program 120C (the sequence command computation program 124 and the user program 125) using the transfer tool 223 (S25).

If it is detected that the stop of the safety control is needed (NO in S24), the support tool 201 displays a warning on the display of the PC 20 or the like (S26).

If the support tool 201 receives an operation input for transferring from a programmer (YES in S27), the support tool 201 starts transferring the control program 120C (S25). On the other hand, if the support tool 201 receives no operation input for transferring from the programmer (NO in S27), the support tool 201 ends the process.

INDEX TO THE REFERENCE NUMERALS

10 . . . safety control unit
20 . . . PC
31 . . . safety input device
32 . . . output device
101 . . . computation control part
102 . . . memory
103 . . . input and output unit
120C . . . control program
120D . . . control data
120S . . . system program
121 . . . scheduler program
122 . . . data refresh program
123 . . . motion computation program
124 . . . sequence command computation program
125 . . . user program
201 . . . support tool
221 . . . setting tool
222 . . . programing tool
223 . . . transfer tool
224 . . . determination tool

The invention claimed is:

1. A safety control unit comprising:
a memory that stores a system program for safety control, a control program for safety control comprising a sequence command computation program and a user program, and control data; and
a computation control part configured to execute safety control using the control data, the system program, the sequence command computation program, and the user program; and
an input and output unit connecting the computation control part to a safety input device and an output device to be safely controlled, wherein
the system program comprises a data refresh program for executing a data refresh for safety control comprising: refreshing safety input data in the control data stored in the memory via the safety input device; and outputting safety computation results via the output device, and
the computation control part is configured by programming to perform operations comprising:
receiving a change of the sequence command computation program or a change of the user program;
determining whether a safety control continuation setting is set; and
in response to determining that the safety control continuation setting is set:
stopping execution of the sequence command computation program and the user program in response to receiving the change of the sequence command computation program or the user program while continuing to execute the data refresh program;
unloading the sequence command computation program and the user program from the memory;
loading, to the memory, the sequence command program and the user program including the change of the sequence command computation program or the user program while continuing to execute the data refresh program; and
resuming execution of the sequence command computation program and the user program including the change of the sequence command program or the user program while continuing to execute the data refresh program.

2. The safety control unit according to claim 1, wherein the computation control part is further configured by the programming to perform operations further comprising, in response to receiving the change of the sequence command computation program or the change of the user program and determining that the safety control continuation setting is not set:
stopping execution of the data refresh program;
stopping execution of the sequence command computation program and the user program;
unloading the sequence command computation program and the user program from the memory;
loading, to the memory, the sequence command computation program and the user program including the change of the sequence command computation program or the user program; and
resuming execution of the sequence command computation program and the user program including the change of the sequence command computation program or the user program and resuming execution of the data refresh program.

3. A safety control method, comprising:
storing, in a memory, a system program for safety control, a control program for safety control comprising a sequence command computation program and a user program, and control data;
executing safety control using the control data, the system program, the sequence command computation program, and the user program;
executing a data refresh program, included in the system program, for executing a data refresh for safety control comprising: refreshing safety input data in the control data stored in the memory; and outputting safety computation results;
receiving a change of the sequence command computation program or a change of the user program;
determining whether a safety control continuation setting is set; and
in response to determining that the safety control continuation setting is set:
stopping execution of the sequence command computation program and the user program in response to receiving the change of the sequence command computation program or the user program while continuing to execute the data refresh program;
unloading the sequence command computation program and the user program from the memory;
loading, to the memory, the sequence command computation program and the user program including the change of the sequence command computation program or the user program while continuing to execute the data refresh program; and
resuming execution of the sequence command computation program and the user program including the change of the sequence command computation program and the user program while continuing to execute the data refresh program.

4. A non-transitory computer-readable storage medium storing a safety control program, which when read and executed causes a computation control part to execute operations comprising:
storing, in a memory, a system program for safety control, a control program for safety control comprising a sequence command computation program and a user program, and control data;
executing safety control using the control data, the system program, the sequence command computation program, and the user program;
executing a data refresh program, included in the system program, for executing a data refresh for safety control comprising: refreshing safety input data in the control data stored in the memory; and outputting safety computation results;
receiving a change of the sequence command computation program or a change of the user program;
determining whether a safety control continuation setting is set; and
in response to determining that the safety control continuation setting is set:
stopping execution of the sequence command computation program and the user program in response to receiving the change of the sequence command computation program or the user program while continuing to execute the data refresh program;
unloading the sequence command computation program and the user program from the memory;
loading, to the memory, the sequence command computation program and the user program including the change of the sequence command computation program or the user program while continuing to execute the data refresh program; and
resuming execution of the sequence command computation program and the user program including the change of the sequence command computation program and the user program while continuing to execute the data refresh program.

5. The method according to claim 3, further comprising:
in response to receiving the change of the sequence command control program or the user program program and determining that the safety control continuation setting is not set:
stopping execution of the data refresh program;
stopping execution of the sequence command computation program and the user program;
unloading the sequence command computation program and the user program from the memory;
loading, to the memory, the sequence command computation program and the user program including the change of the sequence command computation program or the user program; and
resuming execution of the sequence command computation program and the user program including the change of the sequence command computation program or the user program and resuming execution of the data refresh program.

* * * * *